Figure 1:
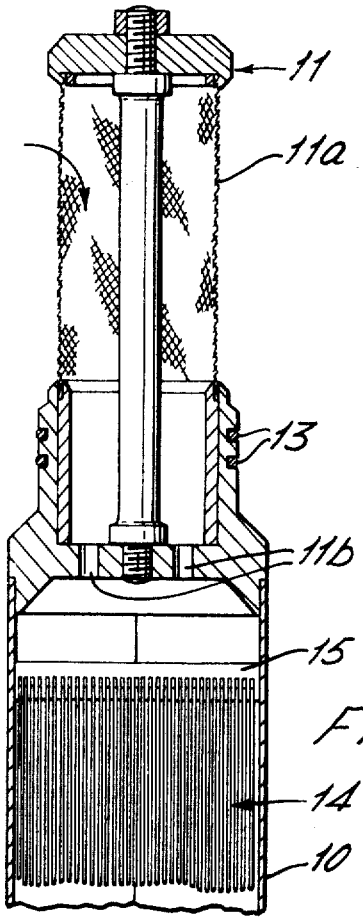

May 30, 1967  A. BARKER ET AL  3,322,645

SHEATHED FUEL PLATE ASSEMBLIES FOR A NUCLEAR REACTOR

Filed Sept. 3, 1965

3,322,645
SHEATHED FUEL PLATE ASSEMBLIES FOR A NUCLEAR REACTOR

Allan Barker, Chester, Alan Gilbert Bool, Tarvin, Chester, and Ronald Tunstall Ackroyd, Upton-by-Chester, England, assignors to United Kingdom Atomic Energy Authority, London, England
Filed Sept. 3, 1965, Ser. No. 484,963
Claims priority, application Great Britain, Sept. 4, 1964, 36,353/64; Sept. 18, 1964, 38,294/64
7 Claims. (Cl. 176—75)

The present invention relates to fuel element assemblies for nuclear reactors and is concerned especially with those composed of sheathed fuel plates.

With fuel plates arranged in the assembly to leave a gap of constant width for coolant flow between adjacent plates, as when the plates are spaced in parallel relationship, there is the advantage of highly efficient utilisation of the coolant flow for heat transfer purposes. However, if the fuel is of a kind which liberates fission product gases in the course of irradiation in the reactor, the sheathing has to be bonded to the fuel or otherwise rendered subject to restraint against detachment from the fuel as a result of high internal pressure; the tendency of this internal pressure is to produce an effect known as "pillow-casing." Bonds between sheath and fuel which are reliable in service may not be easy to obtain even where the fuel is at least in part metallic in character; where the fuel is entirely of a ceramic material such as oxide the possibility of such a bond is generally discounted altogether. Thus, in cases where the chosen fissile material for the fuel is uranium dioxide, possibly with plutonium dioxide, it is generally considered necessary for fabrication in the form of plates that the fuel is a cermet in which the fissile material is dispersed in a matrix of a non-fissile metal, such as stainless steel. Such a matrix is an inert diluent in the nuclear reactor core and is therefore present at the expense of the breeding capability one could obtain with fertile material in its place. Breeding gain is an important consideration for so-called fast reactors and it is for this type of reactor that the invention is particularly applicable. Although not limited in its broader aspects to oxide fuel, the invention has as an object the provision of a fuel element assembly which enables the advantages of fuel plates to be obtained for oxide fuel without recourse to non-fissile dilution.

According to the invention, the fuel in each plate of an assembly of sheathed fuel plates is in discrete masses contained in swellings of the plate, the sheathing being unitary between the swellings and the shape of the swellings in conjunction with the arrangement of the plates in the assembly being such that the swellings on opposing faces of adjacent plates intermesh while leaving between such faces a gap of constant width for coolant flow. The feature that the sheathing is unitary between the swellings limits the area of possible distension by internal pressure and the swollen shape by which the individual fuel masses are enclosed affords the possibility of efficient pressure containment.

In the assembly in accordance with the invention the plates could be fashioned into closed shapes nested concentrically one within another. For application in fast reactors, however, it is contemplated that the plates would be in a spaced parallel relationship.

Preferably each swelling projects equally to either side of the mid-plane of each plate. The configuration in cross section can therefore be visualised as having webs of sheathing between the swollen portions, these webs forming a profile complementary to that of the swollen portions. It is within the scope of the invention to have some angularity in the shape of the swollen portions although it is preferred that this shape is rounded.

Figure 2:
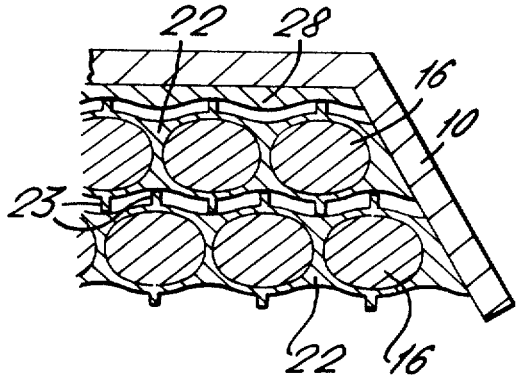
Figure 3:
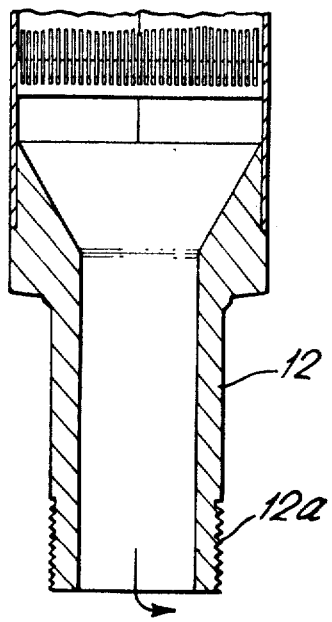

By virtue of the efficient coolant utilisation which the constant width gap allows, fuel assemblies in accordance with the invention are particularly suitable where the coolant volume fraction in a reactor core is advantageously kept as low as possible. An example is a kind of fast reactor core which is cooled by aqueous coolant at supercritical pressure: in such a core there can be a tendency for the reactivity to increase in the event of loss of coolant or flooding, this latter term being used to describe the circumstance of the coolant density increasing to normal water density. This tendency is roughly in proportion to the coolant fraction and is therefore reduced or eliminated by reducing this fraction. It is for a core of this kind that the particular embodiments of the invention illustrated in the accompanying drawings are intended, these embodiments being taken merely by way of example. In the drawings:

FIGURE 1 is a longitudinal section of a typical fuel element assembly, the sections to either side of the centre line being respectively in mutually perpendicular planes, FIGURE 2 is a fragmentary cross section taken through the fuel-containing length of the plates of the assembly in FIGURE 1, FIGURE 3 shows, in the same manner as FIGURE 2, one alternative construction of fuel plate.

As seen in FIGURE 1, the assembly has a tubular casing 10 formed of stainless steel to a hexagonal cross section. At its upper end this casing has a cylindrical top fitting including a gauze filter sleeve 11a and ports 11b allowing coolant to enter into the casing 10 from the top. At the lower end of the casing there is a hollow spike extension 12 at the end of which is a coarse threaded section 12a for securing the assembly in supporting structure of a reactor core. The assembly has been designed for use in a multi-pass reactor core cooled by supercritically pressurised aqueous coolant and in order that the coolant pass appertaining to the assembly in question may be sealed from adjacent passes there are sealing rings 13 provided in the top fitting 11 for co-operating sealingly with an upper grid structure of the reactor core.

Disposed within the casing 11 is a pack 14 of fuel plates which are interengaged so as to lie in parallel planes. The maximum thickness of these plates is so small in relation to the overall dimensions of the assembly that representation in FIGURE 1 is merely by parallel straight lines. These plates are to be understood to have six different sections of length. Starting at the upper end these sections are as follows: the upper end is solely of sheathing which has been flattened; the next section has pockets running in parallel relationship within the sheathing and in these pockets are contained discrete masses of breeder fuel such as natural or depleted uranium oxide; in the next section continuations of the pockets contain the fuel in discrete masses, the fuel being a mixture of the dioxides of uranium and plutonium; in the next section there is breeder fuel once more; in the next section the pockets are devoid of fuel to provide reservoir spaces for the accumulation of fission product gases; the last section, being the lower end, is a repeat of the upper end. Location of the pack in the lengthwise direction of the casing is obtained by rack bars 15 which extend across the inside of the casing transversely of the pack at both ends. The edges of the plates are fitted into slots of these rack bars, the slots of those at the upper end of the pack having extra depth to allow for lengthwise expansion of the plates relative to the casing.

All the fuel plates of the assembly are similarly constructed: each plate as seen in FIGURE 2 has straight longitudinally extending masses of fuel 16 shaped as an ellipse with the major axis in the mid-plane of the plates, these masses being spaced apart and encased by solid sheathing 22 of stainless steel presenting at both faces of the plate a smoothly undulating corrugated profile interrupted only by integral spacer ribs 23 upstanding on the convexities. The convexities of this profile are complementary to the concavities so that when the plates are packed together in the assembly with the fuel-containing swellings of adjacent plates intermeshed the ribs determine a width of coolant gap which is everywhere constant. The ribs, which are also straight and longitudinally extending, are preferably discontinuous.

By comparison with a circular shape, the elliptical shape adopted for the fuel masses serves to increase the fuel to sheathing ratio for a triangular lattice arrangement of the fuel mass centres. With a lattice pitch of 0.23 inch and a coolant gap of 0.035 inch the coolant volume fraction taken over the whole core, including plate supporting parts of the fuel plate assemblies, can be as low as about 15%.

The manufacture of the plates illustrated in FIGURE 2 may be undertaken by such methods as coextruding the fuel and sheath or filling with the fuel a sheath which has been previously formed to the required shape by extrusion or by welding together pressed or rolled halves.

In the construction of FIGURE 3, considerations of the high temperature which may arise in operation of the construction of FIGURE 2 at the sheathing along the plate centre line have led to the employment of composite sheathing: as illustrated, identical rolled sheathing halves 25, 26 of stainless steel presenting the same external profile as in FIGURE 2 are slotted internally at the concavities to receive bridge pieces 27 of a high temperature resistant nickel alloy, these pieces being firmly secured in the slotting as by resistance welding. The bridge pieces constitute a continuous partition between adjacent pockets so that the latter represent individual pressure vessels. In view of the duty of the bridge pieces, the main requirement of high temperature resistance in the material used therefor may be met to some extent at the expense of high ductility under irradiation. FIGURE 3 further shows how the number of integral spacer ribs may be reduced; they are provided only on every fourth convexity so that by suitable relative arrangement of the plates the pitch of the ribs in the constant width coolant gaps is one and a half times the pitch of the fuel masses 16.

A further point evident in FIGURES 2 and 3 is the inclusion as the outer components of the fuel plate pack 14 of a packing 28 which at its side edges is a snug fit in the corners of the hexagonal casing 11 and which presents towards the adjacent outermost fuel plate the same undulating corrugated profile for ensuring that even in this position of the pack the coolant gap is of constant width. Also for providing a snug fit in the casing the plate edges in FIGURE 3 are terminated by a triangular section bridge piece 29.

We are aware of previous proposals whereby cylindrical fuel-containing pockets are joined in a side-by-side parallel relationship by uniform thickness webs to form a fuel plate but believe to be novel the features herein set forth whereby a coolant gap of constant width is obtained.

What we claim is:

1. An assembly of sheathed fuel plates for a nuclear reactor comprising plates whereof the sheathing presents an external profile composed of a series of swellings intermeshed with the swellings of adjacent plates, said profile also having complementary profiled webs alternating between the swellings thereby to define between the plates a gap of constant width for coolant flow, nuclear fuel being contained in said swellings and the sheathing being unitary between the swellings in respect of each plate whereby the fuel in each plate is separated into discrete masses.

2. An assembly as claimed in claim 1 in which the plates are spaced apart in parallel planes.

3. An assembly as claimed in claim 2, in which each swelling projects equally to either side of the mid-plane of each plate.

4. An assembly as claimed in claim 3, in which each plate presents externally a smoothly undulating corrugated profile.

5. An assembly as claimed in claim 4, in which the plate construction is of two halves united directly or indirectly between the swellings.

6. An assembly as claimed in claim 5, in which the halves are united between the swellings by bridge pieces.

7. An assembly as claimed in claim 6, in which the bridge pieces are of a material differing from that of the halves.

References Cited
UNITED STATES PATENTS

| | | | |
|---|---|---|---|
| 2,838,452 | 6/1958 | West et al. | 176—75 X |
| 3,071,526 | 1/1963 | Litt | 176—76 X |
| 3,097,152 | 7/1963 | Walker | 176—75 X |
| 3,105,807 | 10/1963 | Blake | 176—81 X |

CARL D. QUARFORTH, *Primary Examiner.*

BENJAMIN R. PADGETT, *Examiner.*

M. J. SCOLNICK, *Assistant Examiner.*